(12) United States Patent
Shinzaki et al.

(10) Patent No.: US 7,193,345 B2
(45) Date of Patent: Mar. 20, 2007

(54) COLLECTING AND DISTRIBUTING RING FOR ROTARY ELECTRIC MACHINE STATOR

(75) Inventors: Satoru Shinzaki, Tochigi-ken (JP); Tatsuro Horie, Utsunomiya (JP); Kenji Fukuda, Shioya-gun (JP); Akihiro Okamura, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 25 days.

(21) Appl. No.: 10/488,178

(22) PCT Filed: Sep. 3, 2002

(86) PCT No.: PCT/JP02/08930

§ 371 (c)(1),
(2), (4) Date: Mar. 1, 2004

(87) PCT Pub. No.: WO03/021745

PCT Pub. Date: Mar. 13, 2003

(65) Prior Publication Data

US 2004/0251752 A1     Dec. 16, 2004

(30) Foreign Application Priority Data

Sep. 3, 2001   (JP) .............................. 2001-266342

(51) Int. Cl.
*H02K 1/18* (2006.01)
*H02K 3/32* (2006.01)
*H02K 1/12* (2006.01)
*H02K 5/22* (2006.01)
*H02K 3/04* (2006.01)

(52) U.S. Cl. ...................... 310/71; 310/179; 310/218; 310/259

(58) Field of Classification Search .................. 310/71, 310/179, 180, 208, 218, 259
See application file for complete search history.

(56) References Cited

U.S. PATENT DOCUMENTS 1,784,815 A * 12/1930 Apple .......................... 310/211
1,796,422 A * 3/1931 Apple .......................... 310/201

(Continued)

FOREIGN PATENT DOCUMENTS

DE          199 20 127          11/2000

(Continued)

*Primary Examiner*—Karl Tamai
*Assistant Examiner*—Pedro J. Cuevas
(74) *Attorney, Agent, or Firm*—Westerman, Hattori, Daniels & Adrian, LLP.

(57) ABSTRACT

A collection-distribution ring comprises three busbars, each having a circular ring shape, which are integrally connected together with prescribed distances therebetween by an insulating resin. Coil connection terminals project inwardly in a radial direction and are alternately arranged in relation to the three busbars. External terminals project outwardly in the radial direction and are arranged to adjoin together at the prescribed position. These terminals are all exposed from surfaces of the insulating resin. A stator comprises the prescribed number of stator units that are arranged in a circumferential direction and are assembled together with the collection-distribution ring. Each stator unit comprises a core unit realizing magnetic teeth, an insulating member, and a coil. An outer terminal member electrically connects a first end of the coil and the coil connection terminal, and an inner terminal member provides electrical connections between second ends of the adjacent coils.

5 Claims, 9 Drawing Sheets

U.S. PATENT DOCUMENTS

| | | | | |
|---|---|---|---|---|
| 2,961,555 A * | 11/1960 | Towne | | 310/43 |
| 3,464,106 A * | 9/1969 | Barrett | | 29/596 |
| 3,979,822 A * | 9/1976 | Halm | | 29/596 |
| 4,114,056 A * | 9/1978 | Nimura | | 310/42 |
| 4,127,786 A * | 11/1978 | Volkrodt | | 310/156.84 |
| 4,130,331 A * | 12/1978 | Neff et al. | | 439/396 |
| 4,131,988 A * | 1/1979 | Finegold | | 29/596 |
| 4,287,446 A * | 9/1981 | Lill et al. | | 310/71 |
| 4,625,135 A * | 11/1986 | Kasabian | | 310/156.28 |
| 4,689,023 A * | 8/1987 | Strong et al. | | 439/189 |
| 4,926,075 A * | 5/1990 | Fushiya et al. | | 310/50 |
| 5,006,765 A * | 4/1991 | Schmider | | 310/71 |
| 5,066,880 A * | 11/1991 | Banon | | 310/156.55 |
| 5,194,775 A * | 3/1993 | Cooper | | 310/260 |
| 5,233,751 A * | 8/1993 | Luciani et al. | | 29/736 |
| 5,397,951 A * | 3/1995 | Uchida et al. | | 310/156.21 |
| 5,535,503 A * | 7/1996 | Newman | | 29/596 |
| 5,828,147 A * | 10/1998 | Best et al. | | 310/71 |
| 5,898,252 A * | 4/1999 | Tanaka et al. | | 310/214 |
| 5,900,687 A * | 5/1999 | Kondo et al. | | 310/71 |
| 5,949,613 A * | 9/1999 | Moir et al. | | 360/99.08 |
| 5,986,374 A * | 11/1999 | Kawakami | | 310/156.13 |
| 6,011,339 A * | 1/2000 | Kawakami | | 310/208 |
| 6,030,260 A * | 2/2000 | Kikuchi et al. | | 439/890 |
| 6,114,786 A * | 9/2000 | Ishida et al. | | 310/71 |
| 6,172,434 B1 * | 1/2001 | Oohashi et al. | | 310/71 |
| 6,323,571 B1 * | 11/2001 | Nakahara et al. | | 310/71 |
| 6,369,473 B1 * | 4/2002 | Baumeister et al. | | 310/71 |
| 6,369,474 B1 * | 4/2002 | Tanaka et al. | | 310/71 |
| 6,400,059 B1 * | 6/2002 | Hsu | | 310/254 |
| 6,445,097 B1 * | 9/2002 | Zeiler et al. | | 310/71 |
| 6,472,783 B1 * | 10/2002 | Witthohn et al. | | 310/68 R |
| 6,509,665 B1 * | 1/2003 | Nishiyama et al. | | 310/215 |
| 6,545,379 B2 * | 4/2003 | Gomyo | | 310/68 R |
| 6,566,779 B2 * | 5/2003 | Takano et al. | | 310/214 |
| 6,570,280 B2 * | 5/2003 | Takahashi | | 310/71 |
| 6,577,029 B1 * | 6/2003 | Weber et al. | | 310/68 R |
| 6,583,530 B2 * | 6/2003 | Hsu | | 310/254 |
| 6,590,310 B2 * | 7/2003 | Takano | | 310/254 |
| 6,600,244 B2 * | 7/2003 | Okazaki et al. | | 310/71 |
| 6,674,195 B2 * | 1/2004 | Yagyu et al. | | 310/71 |
| 6,744,166 B2 * | 6/2004 | Harter et al. | | 310/214 |
| 6,784,577 B2 * | 8/2004 | Kondo | | 310/71 |
| 6,791,228 B2 * | 9/2004 | Hashiba et al. | | 310/201 |
| 6,800,973 B2 * | 10/2004 | Futami et al. | | 310/71 |
| 6,806,612 B2 * | 10/2004 | Nakamura et al. | | 310/208 |
| 6,856,057 B2 * | 2/2005 | Kobayashi et al. | | 310/71 |
| 6,882,067 B2 * | 4/2005 | Higashino et al. | | 310/51 |
| 6,894,410 B2 * | 5/2005 | Kobayashi et al. | | 310/71 |
| 6,930,418 B2 * | 8/2005 | Kobayashi et al. | | 310/71 |
| 6,958,560 B2 * | 10/2005 | Holzheu et al. | | 310/179 |
| 6,993,829 B2 * | 2/2006 | Kobayashi et al. | | 29/622 |
| 7,045,920 B2 * | 5/2006 | Ohuchi et al. | | 310/71 |
| 2003/0094879 A1 * | 5/2003 | Kobayashi et al. | | 310/238 |
| 2003/0173841 A1 * | 9/2003 | Kobayashi et al. | | 310/71 |
| 2003/0173842 A1 * | 9/2003 | Kobayashi et al. | | 310/71 |
| 2004/0135457 A1 * | 7/2004 | Holzheu et al. | | 310/179 |

FOREIGN PATENT DOCUMENTS

| | | | |
|---|---|---|---|
| EP | 1 050 948 | | 11/2000 |
| JP | 6-22486 | | 1/1994 |
| JP | 6-233483 | | 8/1994 |
| JP | 9-200991 | | 7/1997 |
| JP | 11018345 A | * | 1/1999 |
| JP | 2000-217293 | | 8/2000 |
| JP | 2000-224791 | | 8/2000 |
| JP | 2000-333400 | | 11/2000 |
| JP | 2000-333418 | | 11/2000 |
| JP | 2001-025187 A | | 1/2001 |
| JP | 2001-025198 | | 1/2001 |
| JP | 2001025198 A | * | 1/2001 |
| JP | 2001-119885 | | 4/2001 |
| JP | 2002-95199 | | 3/2002 |
| JP | 2002-171708 | | 6/2002 |
| JP | 2006238641 A | * | 9/2006 |
| WO | WO 97/26700 | | 7/1997 |

* cited by examiner

COLLECTING AND DISTRIBUTING RING FOR ROTARY ELECTRIC MACHINE STATOR

TECHNICAL FIELD

This invention relates to collection-distribution rings for use in stators of rotating electrical machines such as motors and generators.

BACKGROUND ART

Japanese Unexamined Patent Publication No. 2001-25187 discloses a conventional example of a stator for use in a rotating electrical machine such as a motor and a generator. This stator comprises a stator core having a circular ring shape, magnetic teeth wound by coils, a midpoint busbar, and collection-distribution busbars. Specifically, the stator core has a laminated or stacked structure consisting of multiple sheets of magnetic steel. The magnetic teeth are arranged around the stator core in the circumferential direction with prescribed distances therebetween and are each projected inwardly in the radial direction, wherein the magnetic teeth are respectively wound by coils via insulating members. The midpoint busbar is a conductive member having a ring-sheet like shape, which connects together all the inner circumferential ends of the coils. The collection-distribution busbars correspond to three conduction members each having a ring-sheet like shape, each of which connects together the outer circumferential ends of every three coils arranged in the circumferential direction.

FIG. 7 shows an example of the exterior appearance of a single collection-distribution busbar. That is, the collection-distribution busbar 30 comprises a ring sheet 30a, an external terminal 30b, and coil terminals 30c. The external terminal 30b projects outwardly in the radial direction from the ring sheet 30a and is connected with an external device such as a power source (not shown). The coil terminals 30c project inwardly in the radial direction from the ring sheet 30a, wherein each coil terminal 30c is connected with an outer end of a coil wound about three magnetic teeth arranged in the circumferential direction. In the collection-distribution busbar 30, the overall area of the ring sheet 30a is coated with insulating paint, which is shown by dashed lines P in FIG. 7. In contrast, the external terminal 30b and coil terminals 30c are not coated with insulating paint, so that they are exposed from the coated surfaces of the ring sheet 30a.

FIG. 8 shows an example of a stator 37 of a rotating electrical machine, in which the prescribed number of stator cores 31 are arranged in the circumferential direction along with the ring sheet 30a of the collection-distribution busbar 30. Each stator core 31 provides an insulating member 33 having an extended portion 33a, which is extended outwardly in the radial direction. In addition, a coil 32 having two ends 32a and 32b is wound about magnetic teeth 31a via the insulating member 33. Each stator core 31 also provides a terminal member 34 having two connecting portions 34a and 34b. Herein, the first end 32a of the coil is fixed to the extending portion 33a of the insulating member 33 via the first connecting portion 34a of the terminal member 34. The second end 34b of the terminal member 34 fixes the position of the coil terminal 30c, which projects inwardly in the radial direction from the ring sheet 30a of the collection-distribution busbar 30 (see dashed lines in FIG. 8). When the rotating electrical machine is designed as a motor, electric power of a power source (not shown) is transmitted to the collection-distribution busbar 30 via the external terminal 30b. In addition, electric power is distributed to the coils 32 via the terminal members 34, which are fixed onto the extending portions 33a of the insulating members 33.

A midpoint busbar 35 having a ring-sheet like shape is arranged inside of the ring sheet 30a of the collection-distribution busbar 30. The midpoint busbar 35 has the prescribed number of midpoint connection terminals 35a that project outwardly in the radial direction from the midpoint busbar 35 and are sequentially arranged with prescribed pitches therebetween, which are equivalent to pitches of arrangements of the magnetic teeth 31a in the stator cores 31. All the inner ends of the coils 32 are connected together by the midpoint connection terminals 35a. FIG. 9 is an enlarged view of the selected part of FIG. 8 encompassed by a dashed circle. Each insulating member 33 for the magnetic teeth 31 has a second extending portion 33b, which is extended inwardly in the radial direction. A terminal member 36 having two connecting portions 36a and 36b is attached to the second extending portion 33b of the insulating member 33. Herein, the second end 32b of the coil 32 is fixed to the second extending portion 33b of the insulating member 33 via the first connecting portion 36a of the terminal member 36. In addition, the second connecting portion 36b of the terminal member 36 fixes the position of the midpoint connection terminal 35a, which projects outwardly in the radial direction from the outer circumference of the midpoint busbar 35. Thus, the midpoint busbar 35 mutually connects together all the inner ends 32b of the coils 32. That is, the midpoint busbar 35 forms a comprehensive midpoint for all the coils 32.

However, the aforementioned stator 37 has the following problems.

(1) Due to the prescribed positional relationships established between the external terminal 30b and the coil terminals 30c, the three collection-distribution busbars 30 cannot mutually share parts thereof. That is, different sets of parts should be required with respect to different busbars respectively. The three external terminals 30b of the three collection-distribution busbars 30 should be preferably arranged in proximity to each other for the purpose of establishing connections and wiring with the external device. In addition, it is difficult to use common coil terminals among the three collection-distribution busbars 30 because the coil terminals 30c are arranged with prescribed pitches therebetween, which are three times greater than pitches of arrangements of the magnetic teeth 31.

(2) The midpoint busbar 35 differs from the collection-distribution busbar 30 in structure. Therefore, it is impossible to provide the common structure between the midpoint busbar 35 and the collection-distribution busbar 30. This inevitably increases the number of parts, which require a large amount of labor in assembly. In particular, the three collection-distribution busbars 30 resemble each other in shape. Therefore, when they coexist in one place, it is difficult for the worker to discriminate between them. This will reduce the workability in assembly.

(3) The three collection-distribution busbars 30 should be electrically insulated from each other with respect to the coils 32, which are not mutually connected together. The conventional stator 37 is assembled in such a way that the collection-distribution busbars 30 are assembled independently, wherein insulation processes should be reliably performed with respect to all the collection-distribution busbars 30 independently. That is, the conventional stator 37 that requires insulation processes independently on various components requires numerous steps in the manufacture of each single component. In order to ensure insulation performance in a stable manner with respect to each component, it may be necessary to form uniform insulation layers by complicated manufacturing steps such as multilayer coating. This increases the total cost of the product in manufacture.

DISCLOSURE OF INVENTION

It is an object of the invention to provide a collection-distribution ring for a stator of a rotating electric machine, which provides noticeable improvement in assembly and remarkable reduction in the cost of manufacture of the product.

A collection-distribution ring of this invention comprises three busbars, each having a circular ring shape, that are integrally connected together with prescribed distances therebetween by an insulating resin. Herein, coil connection terminals project inwardly in a radial direction from the busbars, wherein they are alternately arranged in relation to the three busbars and are exposed from the insulating resin. In addition, external terminals project outwardly in the radial direction from the busbars, wherein they are arranged to adjoin together at the prescribed position and are exposed from the insulating resin.

A stator for use in a rotating electrical machine comprises the prescribed number of stator units that are arranged in a circumferential direction and are assembled together with the aforementioned collection-distribution ring. Each stator unit comprises a core unit of stacked magnetic metal sheets and realizing magnetic teeth, an insulating member, and a coil. The coil is wound about the core unit via the insulating member. In addition, each stator unit arranges an outer terminal member that electrically connects a first end of the coil wound about the magnetic teeth and the coil connection terminal projecting inwardly from the busbar. Further, each stator unit arranges an inner terminal member that electrically connects a second end of the coil wound about the magnetic teeth and a second end of the other adjacent coil wound about the other adjacent magnetic teeth.

Therefore, the second ends of the coils wound about the magnetic teeth, which are arranged in the circumferential direction, are mutually connected together, thus realizing functions of a midpoint busbar. That is, the collection-distribution ring eliminates the midpoint busbar by merely connecting together the second ends of the coils by the inner terminal members.

In short, the collection-distribution ring of this invention improves the insulation performance between the busbars that are reliably insulated from each other by the insulating resin and are integrally combined together, which contributes to an improvement in productivity. In addition, it eliminates the midpoint busbar, which is conventionally required, to reduce the total weight thereof.

BEST MODE FOR CARRYING OUT THE INVENTION

This invention will be described in further detail by way of examples with reference to the accompanying drawings.

Figure 1:
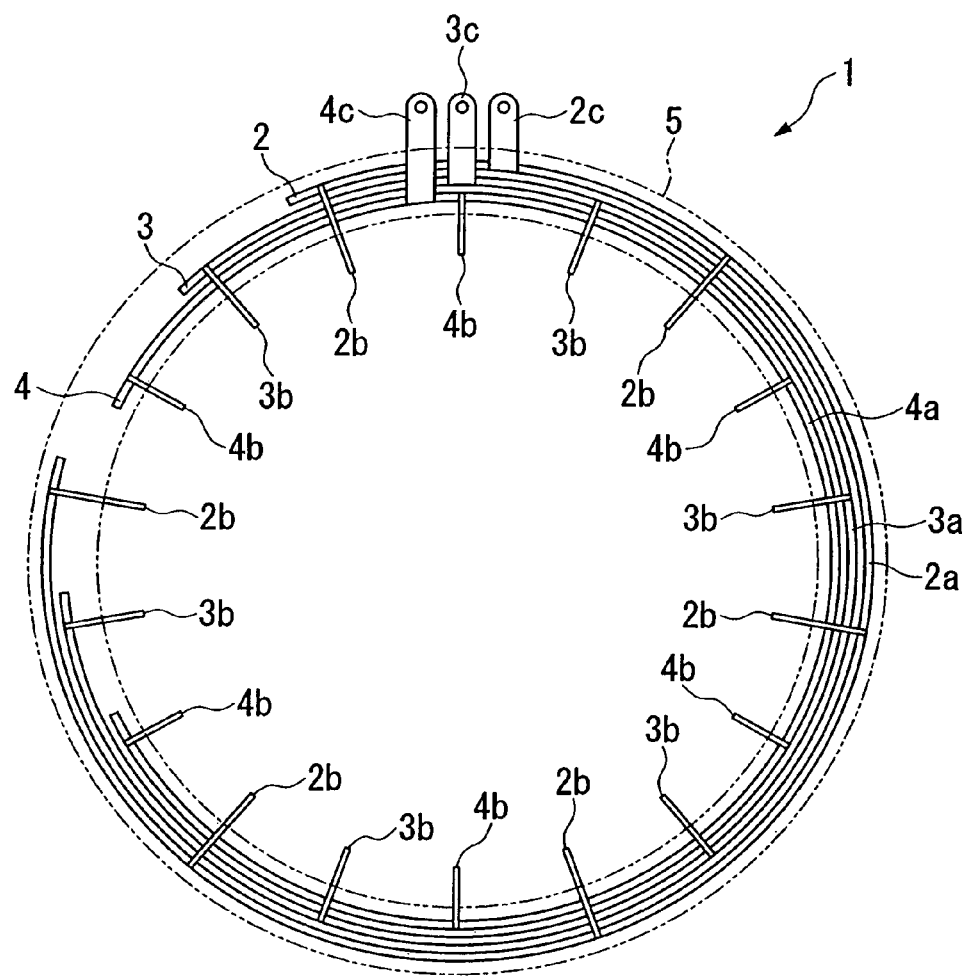
FIG. 1 is a front view showing a collection-distribution ring comprising three busbars and a resin (not shown) in accordance with a first embodiment of the invention.

Now, a stator having collection-distribution rings will be described in accordance with a first embodiment of the invention. FIG. 1 shows a collection-distribution ring 1 for use in a three-phase rotating electrical machine in accordance with the first embodiment. The collection-distribution ring 1 comprises three busbars (or conductive members) 2, 3, and 4, and an insulating resin 5, wherein each busbar is made by curving or bending a conductive sheet material having a sheet-band shape into roughly a cylinder-like shape in curling process (or round bending process). The insulating resin 5 made of an insulating resin material is formed to wrap and integrally fix together the three busbars 2, 3, and 4.

When the rotating electrical machine is designed as a motor, the collection-distribution ring 1 is used for distribution of electric power supplied from an external power source (not shown). When the rotating electrical machine is designed as a generator, the collection-distribution ring 1 is used for collection of electric power supplied to an external device (not shown).

The busbars 2, 3, and 4 comprise cylinder sections 2a, 3a, and 4a, each having an imperfect cylinder-like shape, a part of which is cut out in the circumferential direction, as well as prescribed numbers of coil terminals 2b, 3b, and 4b, and external terminals 2c, 3c, and 4c. The coil terminals 2b, 3b, and 4b are sequentially arranged in the circumferential direction with prescribed distances therebetween, wherein each of them projects inwardly in the radial direction. The external terminals 2c, 3c, and 4c project outwardly in the radial direction from prescribed positions of the busbars 2, 3, and 4 respectively, wherein they are arranged to adjoin together in the circumferential direction. The three busbars 2, 3, and 4 respectively provide the three cylindrical sections 2a, 3a, and 4a having different radius dimensions. When the three busbars 2, 3, and 4 are assembled together in conformity with the same center area, they are arranged concentrically with prescribed distances therebetween.

The distance between the adjacent coil terminals 2b, 3b, and 4b is three times greater than the distance between adjacent magnetic teeth 7 of the stator 6, which will be described later. The coil terminals 2b, 3b, and 4b have different lengths by which they are extended in the same depth into the hollow area formed in the three busbars 2, 3, and 4 that are arranged concentrically. That is, the coil terminals 2b, 3b, and 4b are sequentially reduced in lengths in such a way that the coil terminal 2b projecting inwardly from the busbar 2 having the largest radius has the longest length, while the other coil terminals 3b and 4b projecting inwardly from the other busbars 3 and 4 having smaller radiuses are sequentially reduced in lengths.

The external terminals 2c, 3c, and 4c are formed at prescribed positions of the cylinder sections 2a, 3a, and 4a at which when the three busbars 2, 3, and 4 are arranged to adjoin together with prescribed intervals of distance therebetween, pitches of arrangements of the coil terminals 2b, 3b, and 4b become identical to pitches of arrangements of the magnetic teeth 7, which project inwardly in the radial direction of the stator 6.

The prescribed patterns realizing the busbars 2, 3, and 4 are pressed out from a single metal thin sheet and are then formed into cylinder-like shapes by curling processes. Thereafter, by effecting bending processes, the coil terminals 2b, 3b, and 4b are bent inwardly in the radial direction, while the external terminals 2c, 3c, and 4c are bent outwardly in the radial direction.

As shown in FIG. 1, these busbars 2, 3, and 4 are arranged to mutually adjoin together in a concentric manner with prescribed intervals of distance therebetween, wherein before assembling with a stator (see dashed circles), they are integrally connected together by a resin 5, thus forming an integral conduction unit.

Figure 2:
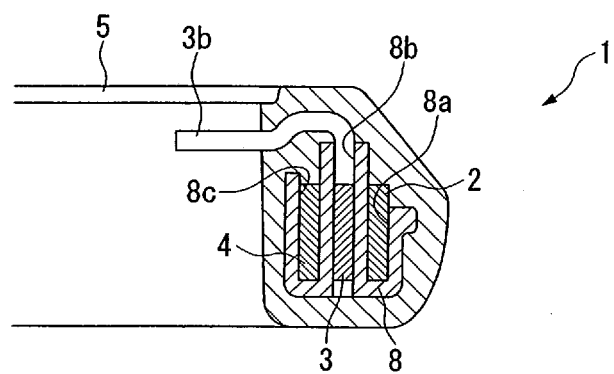
FIG. 2 is vertical sectional view showing selected parts of the collection-distribution ring whose busbars are held in a rail.

The three busbars 2, 3, and 4 are fixed together by the resin 5 in accordance with the following steps:

First, these busbars 2, 3, and 4 are inserted into three channels 8a, 8b, and 8c within an insulating rail 8 having a circular ring shape as shown in FIG. 2.

At this time, the coil terminals 2b, 3b, and 4b that project inwardly in the radial direction with respect to the busbars 2, 3, and 4 are arranged with different distances corresponding to prescribed angles realizing pitches of arrangements of the magnetic teeth 7. Thus, the coil terminals 2b, 3b, and 4b are alternately arranged with prescribed pitches therebetween, which match the pitches of arrangements of the magnetic teeth 7, so that they project inwardly in the radial direction with respect to the busbars 2, 3, and 4 respectively. In addition, the external terminals 2c, 3c, and 4c are arranged to mutually adjoin together with prescribed distances therebetween with respect to the busbars 2, 3, and 4 respectively.

The aforementioned rail 8 is made of insulating materials. In order to secure stable insulation performance, sufficiently high side walls are arranged to secure wayside distances between the busbars 2, 3, and 4, which are clearly partitioned from each other. Under the condition where the busbars 2, 3, and 4 are respectively held in the channels 8a, 8b, and 8c of the rail 8, an insulating resin that is melted and stored in a cavity of a metal mold (not shown) is injected into the rail 8 and is then hardened, thus forming the resin 5 integrally fixing together the three busbars 2, 3, and 4 with different distances.

Thus, it is possible to reliably produce one unit of the collection-distribution ring 1 in which the three busbars 2, 3, and 4 are integrally fixed together by the resin 5. In the collection-distribution ring 1, the three busbars 2, 3, and 4 are integrally fixed together inside of the resin 5 having a circular ring shape in such a way that they are mutually and electrically insulated from each other by the insulating rail 8 and the insulating resin. With respect to the busbars 2, 3, and 4, the coil terminals 2b, 3b, and 4b are exposed from the surface of the resin 5 and project inwardly in the radial direction, while the external terminals 2c, 3c, and 4c are exposed from the surface of the resin 5 and project outwardly in the radial direction.

Figure 7:
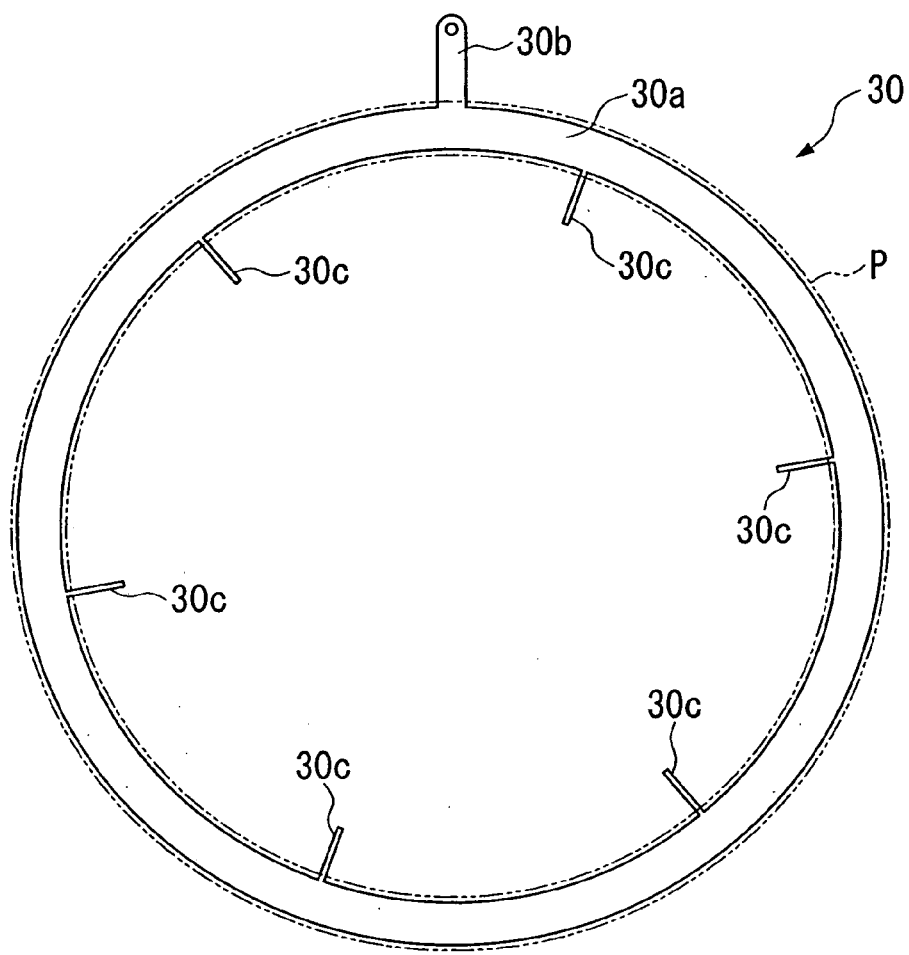
FIG. 7 is a front view showing a conventional example of a collection-distribution busbar for use in a stator of a rotating electrical machine.

The collection-distribution ring 1 of the present embodiment greatly differs from the conventional busbar 30 having a ring sheet shape shown in FIG. 7 because the busbars 2, 3, and 4 can be produced from the conduction sheet material (normally, copper sheet) having a band sheet like shape by curling processes. Therefore, the yield in the manufacture using the 'expensive' material is improved to realize a remarkable reduction in the manufacturing cost.

In addition, it is not required to form each busbar into a perfect cylinder-like shape. In other words, the cylinder sections 2a, 3a, and 4a are not required to realize numerous pitches that are substantially three times greater than the pitches of arrangements of the magnetic teeth 7. In this point, the present embodiment can noticeably conserve materials for use in manufacture. When the busbars 2, 3, and 4 are each formed in an imperfect cylinder-like shape, they may be slightly reduced in strengths. To compensate for such a small weakness, the collection-distribution ring 1 is designed in such a way that the busbars 2, 3, and 4 are reliably supported by the rail 8 and are integrally fixed together by being encapsulated into the resin 5. Hence, the busbars 2, 3, and 4 will not be deformed.

Since the three busbars 2, 3, and 4 are integrally fixed together by the resin 5, the collection-distribution ring 1 of the present embodiment can improve the workability in assembling of the stator 6. In the conventional method, three busbars 30 are separated from each other and are independently assembled together with the stator, wherein a worker is required to make distinctions between the three types of busbars 30 having similar shapes. In contrast, the collection-distribution ring 1 of the present embodiment allows a worker to easily install the three busbars 2, 3, and 4 in the stator 6.

In addition, the present embodiment ensures electrical insulation in a stable manner between the three busbars 2, 3, and 4 in the collection-distribution ring 1. The conventional method uses the three busbars 30 that are separated from each other and are independently subjected to insulation processes, which are troublesome and are relatively expensive. In contrast, the present embodiment can establish substantially insulated conditions between the busbars 2, 3, and 4 by the insulating rail 8, wherein these busbars are integrally fixed together by the insulating resin 5, thus creating reliably insulated conditions therebetween. Thus, it is possible to guarantee the insulation performance in a stable manner, which brings a noticeable reduction in the manufacturing cost.

Next, a description will be given with respect to a stator 6 of a rotating electrical machine equipped with the collection-distribution ring 1 in accordance with the present embodiment.

Figure 3:
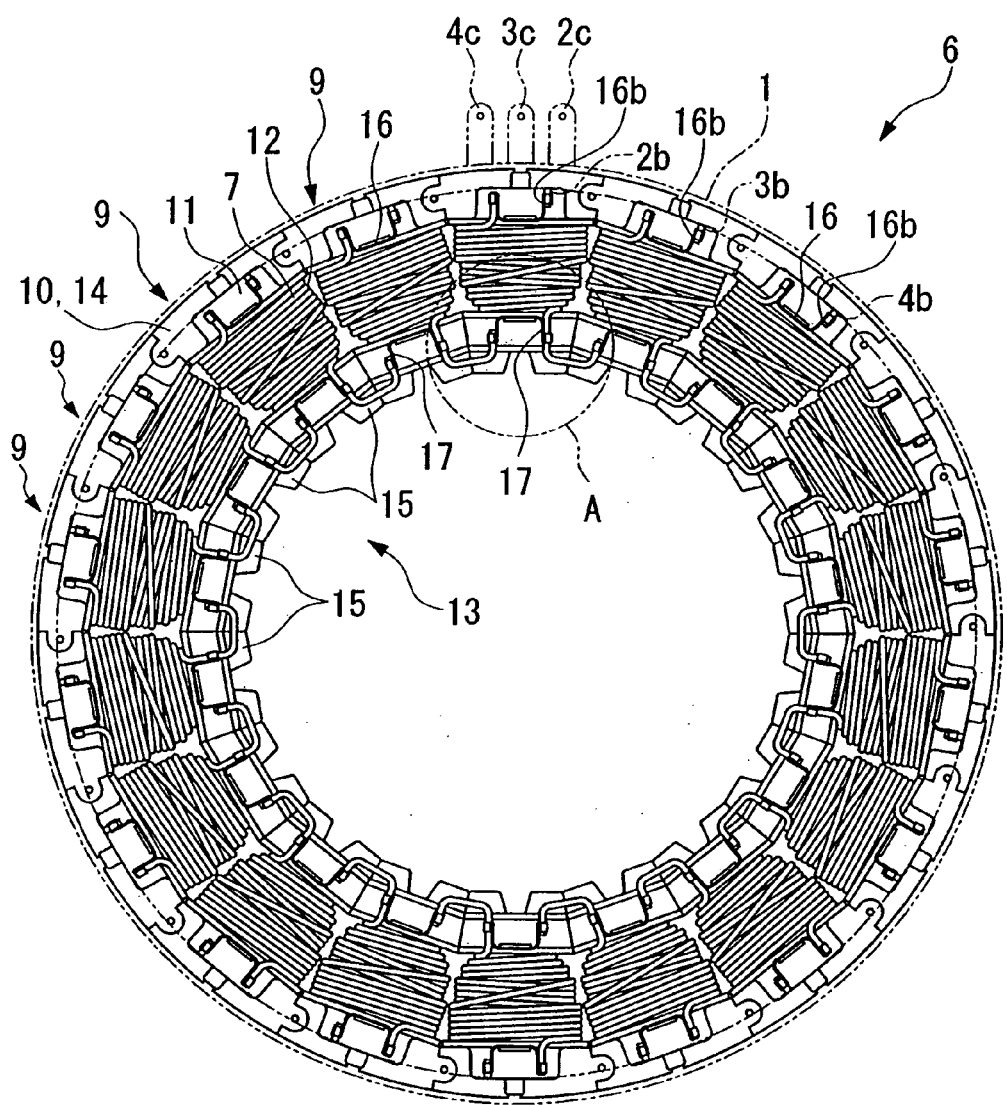
FIG. 3 is a front view showing a stator of a rotating electrical machine equipped with the collection-distribution ring shown in FIG. 1.
Figure 5:
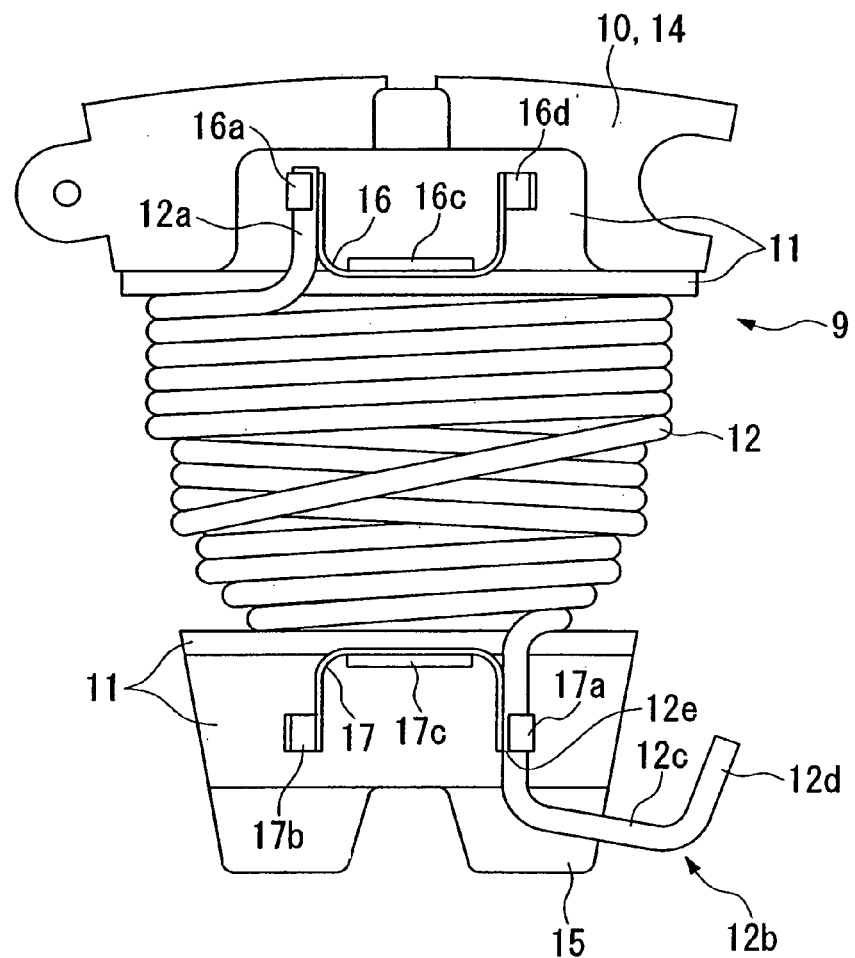
FIG. 5 is a front view showing a single stator unit having terminal members and a coil wound about a stator core of stacked magnetic steel sheets.

FIG. 3 shows the overall mechanical construction of the stator 6 equipped with the collection-distribution ring 1, wherein the prescribed number of stator units 9 are arranged to adjoin together in the circumferential direction. That is, the stator 6 is basically similar to the foregoing stator 37 because both of them have a similar circular ring shape. FIG. 5 shows an enlarged view of the stator unit 9, which comprises a core unit 10, an insulating member 11, and a coil 12. The core unit 10 forms a built-up iron core having stacked (or laminated) 'roughly T-shaped' magnetic steel sheets, which comprise back yokes in the outer circumferential side and magnetic teeth 15 projecting in the inner circumferential side. By arranging the prescribed number of core units 10 in the circumferential direction, it is possible to assemble a stator core 13 having a circular ring shape.

Similarly, each stator unit 9 is made by stacking (or laminating) the prescribed number of magnetic steel sheets 14, around which a coil 12 is wound via an insulating member 11 in the outer circumferential side of the core unit 10 constructing the magnetic teeth 15. Therefore, the stator unit 9 of the present embodiment is basically similar to the conventional one.

Of course, the stator 6 of the present embodiment clearly differs from the conventional stator 37 with respect to the following points:

(a) The stator 6 uses the collection-distribution ring 1 that integrally fixes together the aforementioned three busbars 2, 3, and 4 by the resin 5.
(b) The stator 6 does not use the midpoint busbar 35, which is used in the conventional stator 37.

With respect to the insulating member 11 that is arranged in one terminal end of the accumulated magnetic steel sheets 14, there are provided a pair of terminal members 16 and 17, which are connected with opposite ends of the coil 12 respectively. Specifically, the terminal member 16 is arranged in the outer circumferential side of the stator core 13 and is fixed to the insulating member 11 by a fixing element 16c, while the terminal member 17 is arranged in the inner circumferential side of the stator core 13 and is fixed to the insulating member by a fixing element 17c.

The terminal member 16 has a pair of forked connecting portions 16a and 16b, between which a conductor is sandwiched. Similarly, the terminal member 17 has a pair of forked connecting portions 17a and 17b, between which a conductor is sandwiched. With respect to the 'outer' terminal member 16, a first end 12a (or a collection-distribution terminal) of the coil wound about the magnetic teeth 15 is extended in one terminal end of the stacked magnetic steel sheets 14 constructing the magnetic teeth 15 and is held by the connecting portion 16a. Thus, it is electrically connected with the terminal member 16 by an arbitrary connection method such as pressed or melted bonding, and fusing.

When the collection-distribution ring 1 is arranged in the outer circumferential side of one terminal ends of the magnetic teeth 15 (see dashed circles in FIG. 3), the coil connection terminals 2b, 3b, and 4b that project inwardly in the radial direction from the collection-distribution ring 1 are respectively held by the other connecting portions 16b of the 'outer' terminal members 16 that are arranged in the circumferential direction. Herein, the terminal members 16 having the same shape are arranged in the same positional relationships with the stator unit 9.

As described above, it is possible to simultaneously insert all the coil connection terminals 2b, 3b, and 4b, which project inwardly from the collection-distribution ring 1 and are arranged in the circumferential direction with prescribed intervals of distance therebetween, into the connecting portions 16b of the terminal members 16 that are arranged in the circumferential direction. Herein, by electrically connecting together the coil connection terminals 2b, 3b, and 4b with the connecting portions 16b of the terminal members 16, it is possible to reliably and independently connect together the coils 12 wound about three magnetic teeth 15 with the three busbars 2, 3, and 4.

It is preferable to coat proximate areas between the coil connection terminals 2b, 3b, and 4b, and the connecting portions 16b of the terminal members 16 with insulating resins such as silicone resins. Thus, it is possible to increase the waterproof ability of the stator 6.

The 'inner' terminal members 17 have similar structures of the aforementioned 'outer' terminal members 16. The second end 12b of the coil 12 wound about the magnetic teeth 15 of the stator unit 9 is further extended to form a roughly U-shaped midpoint terminal portion 12c, which is extended toward one terminal end of the other magnetic teeth of the adjacent stator unit. As shown in FIG. 5, an intermediate portion 12e of the U-shaped midpoint terminal portion 12c continuously extending from the second end 12b of the coil 12 wound about the magnetic teeth 15 is held by the first connecting portion 17a of the inner terminal member 17.

Figure 4:
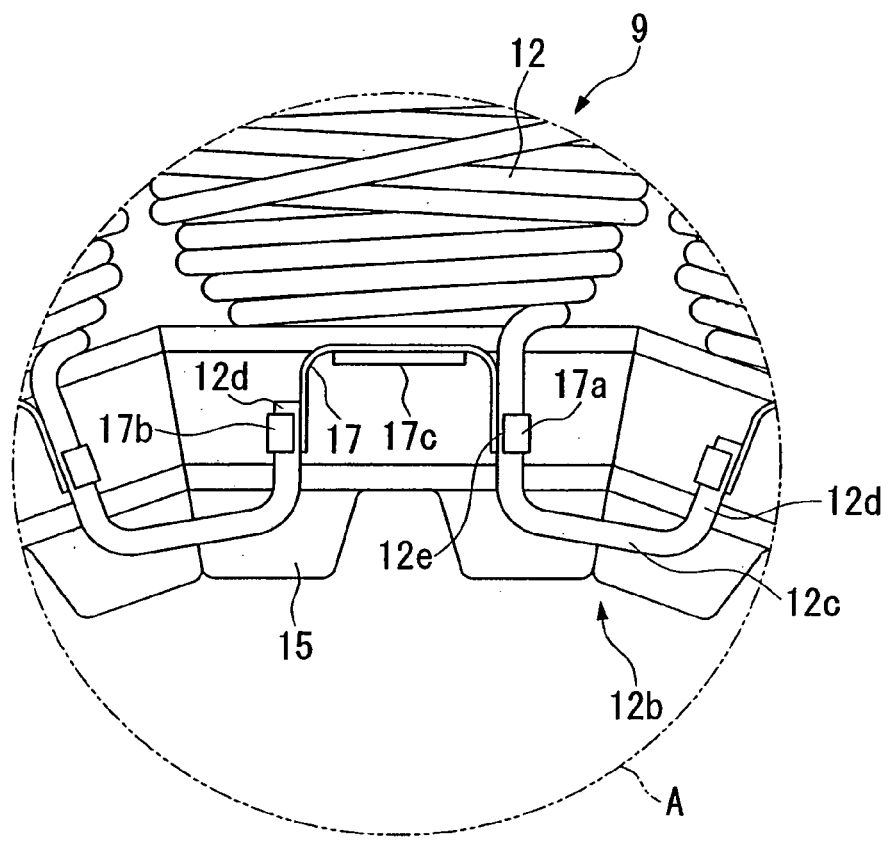
FIG. 4 is an enlarged view magnifying a selected area 'A' of the stator shown in FIG. 3.

As shown in FIG. 4, the second connecting portion 17b of the inner terminal member 17 holds a tip end portion 12d of the midpoint terminal portion 12c that is extended from the 'adjacent' other stator unit 9.

Figure 8:
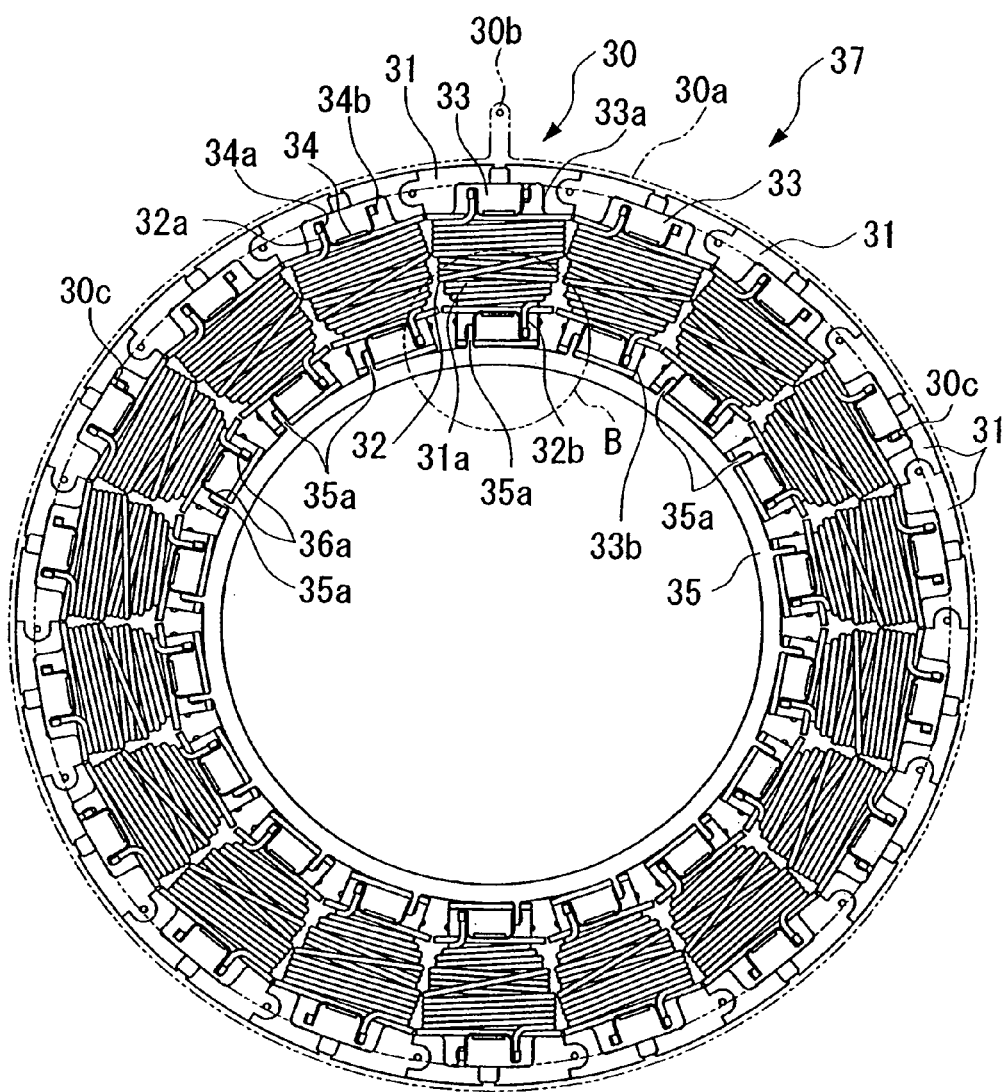
FIG. 8 is a front view showing a conventional example of a stator of a rotating electrical machine equipped with a single collection-distribution busbar shown in FIG. 7.
Figure 9:
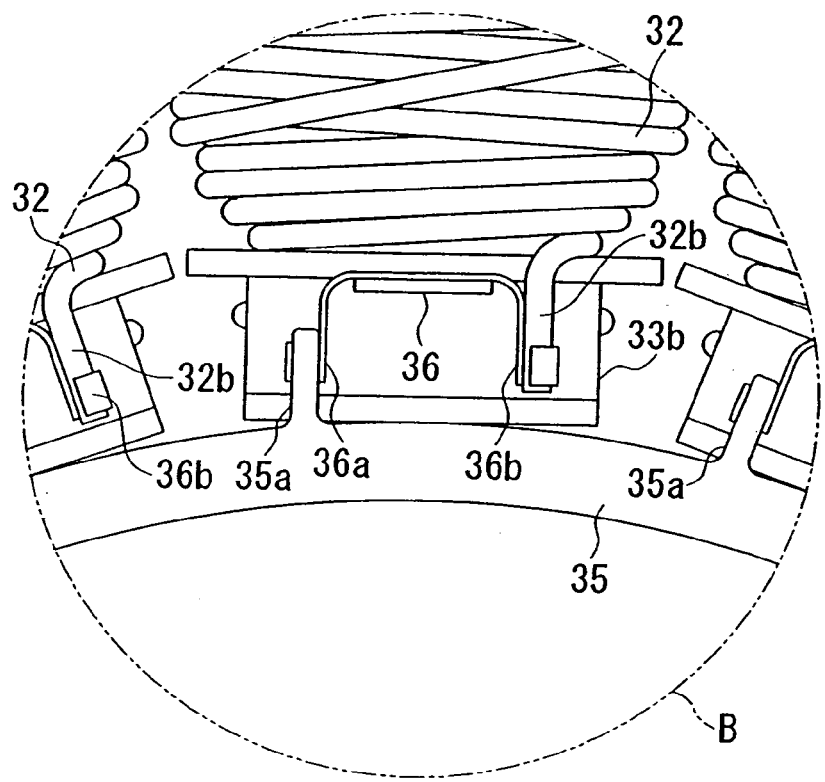
FIG. 9 is an enlarged view magnifying a selected area B of the stator shown in FIG. 8.

Specifically, the stator 6 of the present embodiment differs from the conventional stator 37 connected with a single midpoint busbar 35 (see FIG. 8) in the following points:

(a) The inner terminal member 17 having a pair of forked connecting portions 17a and 17b is arranged in the inner circumferential side of the stator core 13 in stacked T-shaped magnetic steel sheets realizing the magnetic teeth 15, wherein the first connecting portion 17a holds the intermediate portion 12e of the U-shaped midpoint terminal portion 12c extending from the second end 12b of the coil 12 wound about the magnetic teeth 15, so that the tip end portion 12d of the midpoint terminal portion 12c would be connected with the coil wound about the other magnetic teeth of the other 'rightside' stator unit.
(b) The second connecting portion 17b of the inner terminal member 17 holds the tip end portion of the midpoint terminal portion extending from the second end of the coil wound about the other magnetic teeth of the other 'leftside' stator unit.

Therefore, the present embodiment can eliminate the midpoint busbar 35 because of the aforementioned 'unique' construction of the stator unit 9 having the terminal members 16 and 17. This indicates that the stator 6 of the present embodiment may reduce the weight substantially equivalent to the weight of the midpoint busbar 35 compared with the conventional stator 37. Thus, it is possible to noticeably reduce the cost for manufacturing the stator 6 compared with the cost required for manufacturing the conventional stator 37.

Figure 6:
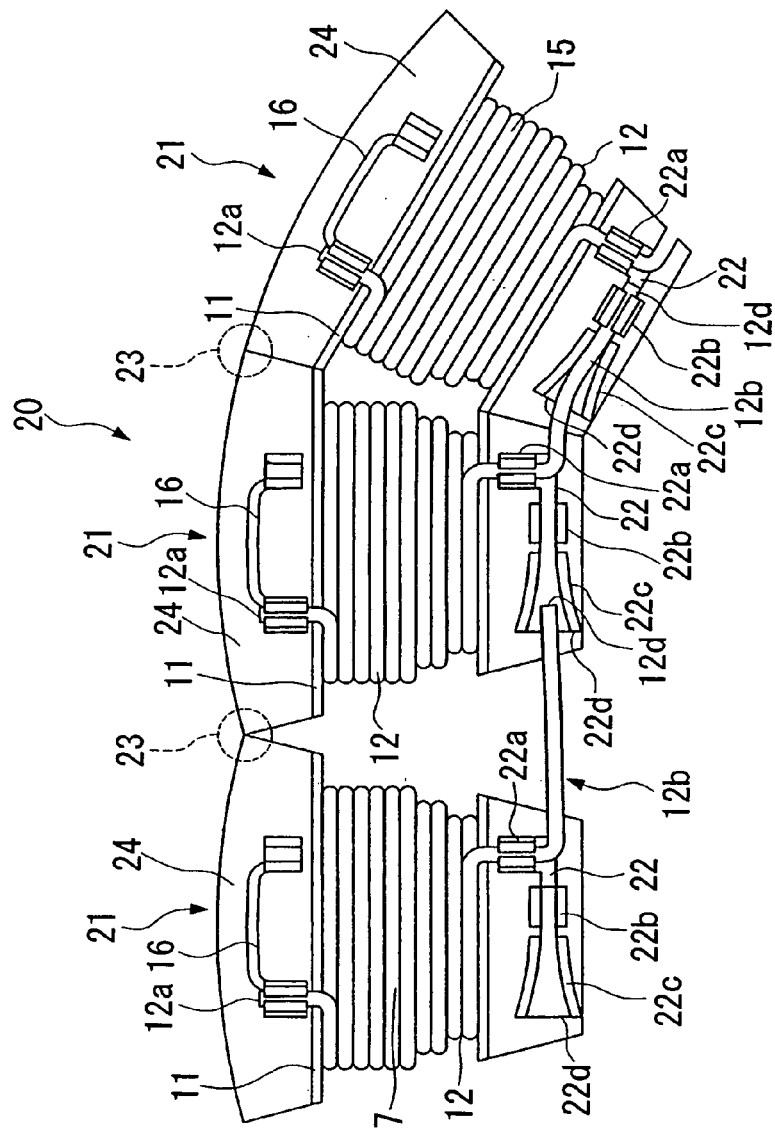
FIG. 6 is a front view showing selected parts of a stator of a rotating electrical machine in accordance with a second embodiment of the invention.

Next, a description will be given with respect to a stator 20 in accordance with the second embodiment of the invention with reference to FIG. 6, wherein parts identical to those shown in FIGS. 3 to 5 for use in the first embodiment are designated by the same reference numerals; hence, the description thereof will be omitted as necessary.

The stator 20 of the second embodiment (see FIG. 6) differs from the stator 6 of the first embodiment in the following points:

(a) Stator units 21 are mutually interconnected together in such a way that they can be adequately folded.
(b) Each stator unit 21 differs from each stator unit 9 in the shape of the midpoint terminal portion.
(c) Similar to the stator unit 9, the stator unit 21 has arranged an outer terminal member 16 in the outer circumferential side thereof in connection with the insulating member 11. In contrast to the stator unit 9, the stator unit 21 arranges a 'specially-designed' inner terminal member 22 in the inner circumferential side thereof in connection with the insulating member 11.

The stator 20 of the second embodiment comprises the stator units 21 whose core units 24 are mutually connected together by means of hinges 23 each having a square shape. That is, the stator units 21 are formed by coating the 'cylindrically-shaped' insulating members 11 with resins and the like; then, the coils 12 are wound about the insulting members 11. FIG. 6 shows two states with respect to interconnections between adjacently arranged stator units 21. At first, the adjacent stator units 21 may be mutually separated from each other but are interconnected together by means of the hinge 23, which is shown in the leftside area of FIG. 6. Then, the stator units 21 are moved in the circumferential direction while folded, so that the adjacent stator units 21 are mutually brought into contact with each other, which is shown in the rightside area of FIG. 6. Thus, it is possible to arrange all the stator units 21 mutually interconnected together by the hinges 23, thus completely forming a stator 20 having a circular ring shape. Similar to the stator 6 of the first embodiment, the first end 12a of the coil 12 is held by the outer terminal member 16. In addition, the second end (12b) of the coil 12 wound about the stator core (13) having the magnetic teeth 15 is extended horizontally towards one terminal end of the other magnetic teeth of the other stator core arranged in the right side. That is, the midpoint terminal portion 12b extending from the second end (12b) of the coil 12 is formed roughly in an L-shape and is further extended rightwards in FIG. 6.

The inner terminal member 22 has a pair of connecting portions 22a and 22b. The first connecting portion 22a holds the intermediate portion 12e of the 'L-shaped' midpoint terminal portion 12b extending from the second end (12b) of the coil 12 wound about the stator unit 21, while the second connecting portion 22b holds the tip end portion 12d of the midpoint terminal portion 12b of the coil 12 that is extended from and wound about the leftward adjacent stator unit 21. In the terminal member 22, the second connecting portion 22b is separated from the first connecting portion 22a and is accompanied with a guide portion 22c for guiding the tip end portion 12d of the midpoint terminal portion 12b extended from the leftside therefor.

The function of the first connecting portion 22a of the terminal member 22 may be similar to that of the first connecting portion 17a of the terminal member 17 arranged for the stator unit 9 of the stator 6 of the first embodiment. In contrast, the second connecting portion 22b is arranged to be directed substantially perpendicular to the first connecting portion 22a. In addition, the guide portion 22c is opened and arranged to conform with the input side of the second connecting portion 22b. FIG. 6 shows an example of the guide portion 22c whose opening width is gradually decreased towards the input side of the second connecting portion 22b. In other words, the guide portion 22c has a wide opening portion 22d that is directed towards the other stator unit 21 arranged in the leftside.

As described above, the stator 20 of the second embodiment is formed and formed by the following steps:

(a) The magnetic teeth 15 are covered with the insulating member 11, about which the coil 12 is wound. The stator units 21 are assembled together and folded via the hinges 23, so that the stator 20 having a circular ring shape is completely formed by interconnecting together the stator units 21 in the circumferential direction.

(b) In the above, the stator units 21 are assembled together in such a way that the tip end 12d of the midpoint terminal portion 12b of the coil 12 extended from the inner circumferential side of one stator unit 21 is inserted into the opening 22d of the guide portion 22c of the other 'adjacent' stator unit 21; then, the stator units 21 are moved in the circumferential direction. Thus, the adjacent stator units 21 are reliably combined together in such a way that the tip end 12d of the midpoint terminal portion 12b of the coil 12 extended from one stator unit 21 is guided by interior walls of the guide portion 22c and is held in the second connecting portion 22b of the inner terminal member 22 arranged in the inner circumferential side of the other 'adjacent' stator unit 21.

(c) After the adjacent stator units 21 are brought into contact with each other, the tip end 12d of the midpoint terminal portion 12b of the coil 12 of one stator unit 21 is firmly connected together with the second connecting portion 22b of the inner terminal member 22 of the other adjacent stator unit 21 by an appropriate connection method such as pressed or melted bonding, and fusing. Thus, it is possible to electrically connect the midpoint terminal portion 12b and its proximate area of the coil 12 of one stator unit 21 with the midpoint terminal portion 12b and its proximate area of the coil 12 of the other adjacent stator unit 21. By performing the aforementioned operation with respect to all the stator units 21 arranged in the circumferential direction, it is possible to construct the stator 20 having a circular ring shape in such a way that all the midpoint terminal portions 12b are connected together among the stator units 21.

(d) In the above, the guide portion 22c of the inner terminal member 22 of one stator unit 21 guides the tip end 12d of the midpoint terminal portion 12b, which is certainly inserted into and held in the second connecting portion 22b of the inner terminal member 22 of the other adjacent stator unit 21. This greatly helps a worker to perform the connection operation with respect to the stator units 21 when assembling the stator 20.

The embodiments of this invention are described with respect to the stators 6 and 20 each for use in a rotating electrical machine, in which a rotor (not shown) is arranged oppositely with a prescribed gap in relation to the magnetic teeth 15 projecting inwardly in the radial direction. Of course, this invention is not necessarily limited to these embodiments. Therefore, this invention can be easily applied to the other type of the rotating electrical machine in which a hollow rotor having a cylinder-like shape (not shown) is arranged externally of the stator whose magnetic teeth 15 project outwardly in the radial direction.

As described heretofore, this invention has a variety of effects and technical features, which will be described below.

(1) Since the collection-distribution ring of this invention fixes together multiple busbars adjoining together with prescribed distances therebetween by an insulating resin, it is possible to remarkably improve the workability in assembling the collection-distribution ring together with stator units arranged in the circumferential direction. Therefore, this invention does not require some of the assembling processes of the conventional stator in which a worker is required to make distinctions between similar busbars (or conduction members) and is also required to assemble them together independently. Therefore, this invention contributes to a noticeable reduction of the time required for the assembly of a stator. In addition, it is possible to reliably avoid occurrence of errors in assembly.

(2) Multiple busbars (or conduction members) are integrally combined together by the insulating resin, which allows reliable insulation processes simultaneously with respect to multiple busbars. Therefore, it is possible to improve the reliability in manufacture of products of stators. In addition, it is possible to remarkably reduce the cost for manufacturing products of stators.

(3) Coil connection terminals are exposed from the surface of the resin and project from the inner circumferential side of the collection-distribution ring with prescribed pitches therebetween, which match pitches of arrangements of magnetic teeth. Herein, by merely adjusting the magnetic teeth and coil connection terminals in positions only at a certain location, it is possible to establish prescribed positional relationships between them along the inner circumferential side of the stator. This guarantees easy-to-handle assembly in manufacture of the stator.

(4) In the collection-distribution ring, the busbars are adequately connected with coils wound about magnetic teeth of stator units, which are arranged to adjoin together in the circumferential direction. This guarantees the proper collection and distribution of electricity with respect to the coils, which are reliably insulated from each other. Thus, it is possible to produce a rotating electrical machine having a relatively high reliability at a relatively low cost.

(5) This invention eliminates the necessity of arranging a midpoint busbar in the collection-distribution ring, which in turn contributes to a reduction of the total weight of a rotating electrical machine such as a motor. Hence, it is possible to produce a motor at a relatively low cost because the collection-distribution ring of this invention does not require the process of producing the midpoint busbar and reduces the total cost of manufacture.

(6) The stator comprises stator units having terminal members and insulating members, wherein the adjacent stator units are combined together in such a way that a coil end extending from one stator unit is connected with a midpoint terminal portion of the other adjacent stator unit by the terminal member and is fixed to the insulating member. This reliably reinforces the connection between the adjacent stator units assembled together in the circumferential direction of the stator. Hence, it is possible to maintain connections between stator units of the stator in integrity. Therefore, it is possible to produce a rotating electrical machine having a relatively high reliability.

(7) The inner terminal members of the stator units provide guide portions, by which the coil end extending from one stator unit is reliably and easily inserted into the terminal member of the other adjacent stator unit. Because of the provision of the guide portions, it is possible to guarantee simple and highly efficient operations in assembling together the stator units. Thus, it is possible to improve the productivity in manufacturing stators.

As this invention may be embodied in several forms without departing from the spirit or essential characteristics thereof, the present embodiments are therefore illustrative and not restrictive, since the scope of the invention is defined by the appended claims rather than by the description preceding them, and all changes that fall within metes and bounds of the claims, or equivalents of such metes and bounds are therefore intended to be embraced by the claims.

The invention claimed is:

1. A stator for a rotating electrical machine, comprising:
a stator core having a plurality of magnetic teeth that are arranged in a circumferential direction with prescribed distances therebetween and wherein each tooth projects in a radial direction; and
a plurality of coils that are wound about the magnetic teeth of the stator core via insulating members,
wherein each of the coils is extended to provide a terminal end towards one terminal portion of a stator core unit, and the terminal end of each coil is connected with a coil connection terminal of a conduction member,
and wherein each coil is respectively extended to provide a midpoint terminal portion and is connected with a coil of an adjacent stator unit so that adjacent coils are mutually connected together therewith by their midpoint terminal portions.

2. The stator for a rotating electrical machine according to claim 1, wherein the insulating members are respectively equipped with terminal members that provide electrical connections between intermediate portions and tip end portions of the midpoint terminal portions of the adjoining coils.

3. The stator for a rotating electrical machine according to claim 2, wherein the terminal members have guide portions for guiding the terminal end portions of the adjoining coils.

4. A stator for a rotating electrical machine, comprising:
a collection-distribution ring comprising a plurality of busbars, each having a circular ring shape, that are integrally connected together with prescribed distances therebetween by an insulating resin, in which coil connection terminals project inwardly in a radial direction and are alternately arranged in relation to the plurality of busbars, and external terminals project outwardly in the radial direction from the plurality of busbars respectively and are arranged to adjoin together, so that the coil connection terminals and the external terminals are all exposed from surfaces of the insulating resin,
wherein a plurality of stator units are arranged in a circumferential direction and are assembled together with the collection-distribution ring,
wherein each stator unit comprises a core unit of stacked magnetic metal sheets realizing magnetic teeth, an insulating member, and a coil, which is wound about the core unit via the insulating member,
and wherein each stator unit provides an outer terminal member that electrically connect a first end of the coil wound about the magnetic teeth and the coil connection terminal projecting inwardly from the busbar, and an inner terminal member that electrically connects a second end of the coil wound about the magnetic teeth together with a second end of an adjacent coil wound about an adjacent magnetic tooth.

5. The stator for a rotating electrical machine according to claim 4, wherein each stator unit provides an inner terminal member that electrically connects a second end of the coil wound about the magnetic teeth and a second end of the adjacent coil that is wound about the adjacent magnetic teeth and is guided by a guide portion.

* * * * *